(12) United States Patent
Talati

(10) Patent No.: US 10,740,535 B2
(45) Date of Patent: Aug. 11, 2020

(54) METHOD AND SYSTEM FOR VISUALIZING OR INTERACTING WITH ARRAY DATA USING LIMITED-RESOLUTION DISPLAY DEVICES

(71) Applicant: Cluster Seven Limited, London (GB)

(72) Inventor: Sumit Talati, London (GB)

(73) Assignee: CLUSTER SEVEN LIMITED, London (GB)

( * ) Notice: Subject to any disclaimer, the term of this patent is extended or adjusted under 35 U.S.C. 154(b) by 141 days.

(21) Appl. No.: 15/577,765

(22) PCT Filed: May 27, 2016

(86) PCT No.: PCT/GB2016/051541
§ 371 (c)(1),
(2) Date: Nov. 28, 2017

(87) PCT Pub. No.: WO2016/193679
PCT Pub. Date: Dec. 8, 2016

(65) Prior Publication Data
US 2018/0165254 A1    Jun. 14, 2018

(30) Foreign Application Priority Data
May 29, 2015 (GB) .................................. 1509331.3

(51) Int. Cl.
*G06F 40/18* (2020.01)
*G06F 40/174* (2020.01)
(Continued)

(52) U.S. Cl.
CPC ............ *G06F 40/106* (2020.01); *G06F 40/18* (2020.01); *G06F 3/0481* (2013.01); *G06F 3/04842* (2013.01)

(58) Field of Classification Search
CPC ..... G06F 17/212; G06F 17/246; G06F 3/0481
See application file for complete search history.

(56) References Cited

U.S. PATENT DOCUMENTS 5,001,697 A * 3/1991 Torres .................... G06F 3/0481
                                                               345/467
8,019,761 B2 * 9/2011 Uehara .................... G06F 16/56
                                                               707/737
(Continued)

FOREIGN PATENT DOCUMENTS

EP          1603052 A1    12/2005
WO    2005081126 A2    9/2005
WO    2008015395 A2    7/2008

OTHER PUBLICATIONS

Eick, S G et al., "Seesoft—A Tool for Visualizing Line Oriented Software Statistics," IEE Transactions on Software Engineering, Nov. 1, 1992, pp. 957-968.
(Continued)

*Primary Examiner* — Scott T Baderman
*Assistant Examiner* — Mario M Velez-Lopez
(74) *Attorney, Agent, or Firm* — Fredrikson & Byron, P.A.

(57) ABSTRACT

Methods and computer systems are disclosed for displaying and interacting with array data on a display device. Limited display device resolutions can complicate the display of large arrays on a display device. Methods according to the disclosure may determine a one-dimensional partitioning of an array of data into a plurality of contiguous array portions; determine a display size for each array portion based on the size of the array portion; display an image representative of the array of data on the display device, portions of the image corresponding to an array portion being sized according to the display size determined for the array portion. The methods are applicable to the processing of images, and the visualization of and interacting with spreadsheet data.

63 Claims, 7 Drawing Sheets

(51) Int. Cl.
*G06F 40/106* (2020.01)
*G06F 3/0481* (2013.01)
*G06F 3/0484* (2013.01)

(56) References Cited

U.S. PATENT DOCUMENTS

| | | | | |
|---|---|---|---|---|
| 8,429,521 | B2* | 4/2013 | Lloyd | G06F 40/18 |
| | | | | 715/234 |
| 8,539,339 | B2* | 9/2013 | Lloyd | G06F 40/18 |
| | | | | 715/234 |
| 8,584,034 | B2* | 11/2013 | Holt | G06F 3/0482 |
| | | | | 715/214 |
| 8,907,990 | B2* | 12/2014 | Yanase | G06F 3/0481 |
| | | | | 345/667 |
| 10,061,759 | B2* | 8/2018 | Chang | G06F 40/18 |
| 10,248,641 | B2* | 4/2019 | Wagh | G06F 40/14 |
| 10,528,209 | B2* | 1/2020 | Alcorn | G06F 3/04817 |
| 2005/0108650 | A1* | 5/2005 | Muehlhausen | H04L 63/0823 |
| | | | | 715/760 |
| 2005/0210403 | A1 | 9/2005 | Satanek | |
| 2005/0273695 | A1* | 12/2005 | Schnurr | H04W 24/00 |
| | | | | 715/213 |
| 2008/0158229 | A1 | 7/2008 | Gossweiler, III et al. | |
| 2010/0146434 | A1 | 6/2010 | Blinnikka et al. | |
| 2010/0205520 | A1* | 8/2010 | Parish | G06F 40/18 |
| | | | | 715/212 |
| 2012/0089914 | A1 | 4/2012 | Holt et al. | |
| 2016/0147904 | A1* | 5/2016 | Wein | G06F 16/9017 |
| | | | | 707/741 |

OTHER PUBLICATIONS

PCT International Search Report and Written Opinion dated Sep. 1, 2016 for Intl. App. No. PCT/GB2016/051541, from which the instant application is based, 11 pgs.

* cited by examiner

| Cell | Change Type | Value | Formula |
|---|---|---|---|
| | | #N/A | =VLOOKUP(Summary[Account1Number],[Actual]!:2,FALSE) |
| E7 | Data Changed | Remaining Budget £<br>Remaining Budget £ | |
| E9 | Cell Error | #N/A | =Summary[YTD Budget]-Summary[YTD Actual] |
| G8 | Function Changed | 25500<br>25050 | +450<br>↑ 1.80% | =Summary[[#This Row],[Remaining Budget £]]*1.7<br>=Summary[[#This Row],[Remining Budget £]]*1.66 |
| G9 | Cell Error | #N/A | =Summary[[#This Row],[Remaining Budget £]]*1.7 |
| G10 | Function | 102000 | +1500 | =Summary[[#This Row],[Remaining Budget £]]*100% |

Key to Colours

| | A | B | C | D | E | F | G | H | I |
|---|---|---|---|---|---|---|---|---|---|
| 1 | | | | | | | | | |
| 2 | | ClusterSeven ES | | | | | | | |
| 3 | ClusterSeven Ltd | | | | | | | | |
| 4 | v2 | | | | | | | | |
| 5 | | | | | | | | | |
| 6 | | | | | | | | | |
| 7 | | Account Number | Account | YTD Actual | YTD Budget | Remaining Budg | Remaining Budg | Remaining Budg | |
| 8 | | 1000 | Office | 35000 | 50000 | 15000 | 25500 | 0.3 | |
| 9 | | 1001 | Office Move | #N/A | 15000 | #N/A | #N/A | #N/A | |
| 10 | | 2000 | Store | 15000 | 75000 | 60000 | 102000 | 0.8 | |
| 11 | | 3000 | Staffing | 90000 | 100000 | 10000 | 17000 | 0.1 | |
| 12 | | 4000 | Equipment | 8000 | 25000 | 17000 | 28900 | 0.68 | |
| 13 | | 5000 | Other | 51000 | 50000 | -1000 | -1700 | -0.02 | |
| 14 | | | | | | | | | |
| 15 | | | | | | | | | |
| 16 | | | | | | | | | |
| 17 | | | | | | | | | |
| 18 | | | | | | | | | |

METHOD AND SYSTEM FOR VISUALIZING OR INTERACTING WITH ARRAY DATA USING LIMITED-RESOLUTION DISPLAY DEVICES

RELATED APPLICATIONS

This application is a 35 U.S.C. 371 national stage filing from International Application No. PCT/GB2016/051541, filed May 27, 2016, which claims priority to British Application No. 1509331.3, filed May 29, 2015, the teachings of which are incorporated herein by reference.

FIELD OF INVENTION

The present invention relates to a method and system for visualizing or interacting with data, more particularly for visualizing or interacting with an array of data on a display device the display device having a limited resolution.

BACKGROUND

Two-dimensional arrays of data may be visualized by mapping rows and columns of the arrays to a corresponding rectangular regions of an image, each rectangular region in the image having the same size, the pixel values within the rectangular region being indicative of the contents of the array at each element. For example, if each element of the array is either one or zero, the pixel values of each rectangular region could each assigned one of two colours, such as white and black, to indicate the value of the element of the array. To ensure that the image will fit in a display region of a display device, the size of the rectangular region is determined by, for example, dividing the width of the display region by the number of columns in the two-dimensional array to be visualized and by dividing the height of the display region by the number of rows in the two-dimensional array to be visualized.

A spreadsheet application is a computer program that allows a user to manipulate two-dimensional and three-dimensional arrays of data. A user of a spreadsheet application is presented with a two-dimensional array of cells, each cell being capable of storing an item of numeric data, text, a software object, or a formula. A three-dimensional spreadsheet has several of such arrays having a definite order. Where a cell contains a formula, the display normally shows the result of the calculation that the formula defines. The formula can include among its input variables the value of another cell within the spreadsheet or within another spreadsheet. The value of the other cell may be the result of calculation of a formula within the other cell. Such linkage between cells can be extended to an arbitrary degree of complexity. The formula can also include a hard-coded value among its input variables.

Two-dimensional arrays of data can arise in spreadsheet applications. For example, the tabular data in a spreadsheet may be considered a two-dimensional array, each element of the array corresponding to a row-column location in the spreadsheet, the element of the array containing the cell contents at that row-column location of the spreadsheet. The two-dimensional array may be indicative of some properties of cells of the spreadsheet rather than the cell contents themselves, such as whether the cell has changed relative to some previous version of the spreadsheet.

The monitoring of changes or other information in a worksheet of a spreadsheet can be displayed visually through generating and displaying an image to the user on a display device, the image showing the locations of certain information in the worksheet, such as the cells in which changes have taken place. Such an image is sometimes termed a 'minimap'. A minimap may show where changes have been made in the worksheet of a spreadsheet. Existing systems implement this by drawing the minimap directly on the display device, scaling the minimap based on the available space on the display device. This could be the whole of the display of the display device or a portion of the display of the display device. For a worksheet-based minimap, this might be done by determining the minimum display area needed per cell and using that to calculate how much area is needed for displaying the changed cells. If the space available for display is less than that needed for displaying the changed cells, then the display area can be wrapped in a scrollable container. On a typical computer display this approach is deficient for anything more than a few hundred rows as the scrolling requirement makes it hard for a user to visualize the changes. Navigation may also be slower as the user is required to scroll to find desired areas of the minimap. Also, when highlighting a single cell on the minimap, it might not be possible to see how that change sits within the context of the whole populated area. As the number of rows and columns increases, this becomes increasingly difficult as the visible area of the minimap shows increasingly fewer rows compared to the total number of rows to be visualized.

Alternatively, the visualization of the entire populated area could be made to fit within the available display space to avoid scrolling. A scale might be adopted such as 1:10, where 1 represents a row and 10 is the number of display units such as pixels. This method is ineffective with large numbers of rows (e.g. 200 rows or more, 300 rows or more, 400 rows or more, 500 rows or more) as the available display units per row goes below 1. A typical display device might have 1080 pixels vertically in its display resolution. If only a region of the display is available for the minimap, this figure could be reduced to 500 pixels available for the minimap. For a worksheet with populated areas of 10000 rows the ratio could be 1:0.05. At such a ratio, single cells cannot practically be highlighted. In the context of spreadsheets, stray single cells are rare and often indicative of errors or key outputs so it is advantageous for the user to be able to spot any such cells, which might not be possible if the ratio is such that each pixel covers, as in this example, 20 cells.

BRIEF SUMMARY OF THE INVENTION

In general, this disclosure describes techniques for visualizing arrays of data, including but not limited to raster image data and spreadsheet data, wherein the display size of portions of the array according to the visualization undergo a non-linear scaling such that the visualization allows different array portions of different sizes to be discernible by a user, even for large size differences, taking into account the limited resolutions of display devices.

A visualization in the form of a displayed image based on an array of data may be used as to provide information to a user via the display device as to the contents of the array of data, and may be used as part of a user interface. A user may use the visualized array of data to interact with the visualized array of data or perform navigation operations on it.

In particular, this disclosure describes technical solutions to problems of visibility and interactivity for a user interface displayed on a video display of limited or finite resolution, wherein the user gains the capability of viewing, interacting with, and navigating around arrays of data including but not limited to spreadsheet data or image data, and particularly for large arrays of data. Even though the display device may be unable to provide one or more pixels per element of the array due to its limited resolution, the technical solutions described herein allow such large arrays to be displayed, visualized, interacted with and/or navigated around on the limited-resolution display device, while the user is able to view, interactive with and/or navigate to the very smallest areas, down to the single element, and up to the largest areas, which may be many orders of magnitude greater in size, without obscuring or hiding either that the areas are of different size or which areas are larger than others.

Therefore this disclosure addresses conflicting technical requirements, namely on the one hand, the array of data to be visualized and interacted with is desired to be displayed on a large scale i.e. zoomed in, so that the user can visualize and interact with the smallest elements such as single isolated elements of the array, while at the same time the display device has too little resolution or too few pixels to show the complete area of interest, which may be all of the array data or may encompass the whole length of the array along its largest dimension.

According to a first aspect of the invention, there is provided a method of display on a display device, the method comprising: determining a one-dimensional partitioning of an array of data into a plurality of contiguous array portions; determining a display size for each array portion based on the size of the array portion, the ratio of the display size determined for the largest array portion divided by the display size determined for the smallest array portion being less than the ratio of the size of the largest array portion divided by the size of the smallest array portion; and displaying an image representative of the array of data on the display device, portions of the image corresponding to an array portion being sized according to the display size determined for the array portion.

According to a second aspect of the invention, there is provided a computer system comprising: a display device; and at least one processor configured to: determine a one-dimensional partitioning of an array of data into a plurality of contiguous array portions; determine a display size for each array portion based on the size of the array portion, the ratio of the display size determined for the largest array portion divided by the display size determined for the smallest array portion being less than the ratio of the size of the largest array portion divided by the size of the smallest array portion; and display an image representative of the array of data on the display device, portions of the image corresponding to an array portion being sized according to the display size determined for the array portion.

According to a second aspect of the invention, there is provided a computer-readable medium storing instructions that, when executed by at least one processor, cause the at least one processor to: determine a one-dimensional partitioning of an array of data into a plurality of contiguous array portions; determine a display size for each array portion based on the size of the array portion, the ratio of the display size determined for the largest array portion divided by the display size determined for the smallest array portion being less than the ratio of the size of the largest array portion divided by the size of the smallest array portion; and display an image representative of the array of data on a display device, portions of the image corresponding to an array portion being sized according to the display size determined for the array portion.

Preferably, determining the one-dimensional partitioning of the array into a plurality of contiguous array portions comprises one of: determining groups of adjacent rows for which each column of the array portion is constant along the length of the column; and determining groups of adjacent columns for which each row of the array portion is constant along the length of the row.

Preferably, determining a display size for each array portion based on the size of the array portion comprises determining a display size for the array portion as a non-decreasing function of the size of the array portion.

Preferably the image has a display size and the method further comprises determining whether the image based on array portions sized according to the display sizes determined for the array portions will fit in the display size of the image and, if the image based on array portions sized according to the display sizes determined for the array portions will not fit in the display size of the image, determining modified display sizes for the array portions. The display size of the image may be a size of a region in the display for displaying the image.

Preferably, determining a display size for each array portion comprises raising the size of an array portion to a power. More preferably, the method comprises iteratively: determining a display size for each array portion based on the power and the size of the array portion; determining whether the image based on array portions, the array portions sized according to the display sizes determined according to the power for the array portions, will fit in the display size of the image; and modifying the power if the image based on array portions, the array portions sized according to the display sizes determined according to the power for the array portions, will not fit in the display size of the image. More preferably, the power is limited to a predetermined range, the range being preferably 0.3 to 1.0.

Preferably, on determining that the image based on array portions sized according to display sizes determined by raising array sizes to a power will not fit in the display size of the image, the method further comprises: combining at least one group of adjacent array portions into a combined array portion; and determining a display size for the at least one combined array portion. More preferably, determining a display size for the at least one combined array portion comprises summing the display sizes determined for each of the array portions combined into the combined array portion.

Preferably, portions of the image corresponding to an array portion other than the array portions that are combined into the at least one combined array portion are sized according to the display size determined for the array portion, and portions of the image corresponding to the array portions that are combined into the at least one combined array portion are sized according to a display size determined for the combined array portion. More preferably, the at least one combined array portion is displayed differently from other array portions in the image displayed on the display device.

Preferably the array of data is based on spreadsheet data and determining a one-dimensional portioning of the array into a plurality of contiguous array portions comprises determining a portioning of the array into contiguous row ranges. More preferably, the array of data is based on an indication of at least one of: areas within a spreadsheet in which a change is detected; areas within a spreadsheet in which cells have formulas; areas within a spreadsheet in which cells are populated; and areas within a spreadsheet in which cells match specific conditions. More preferably, the array of data is based on an indication of areas within a spreadsheet in which a change is detected and indicates, for changed cells in the spreadsheet, a type of change, the type of change being selected from a group comprising an addition, a deletion, and a modification. Preferably, the displayed image includes an indication of one or more currently selected cells.

Preferably, the method comprises, on detecting a user interface interaction on the displayed image, determining a location of the user interface action on the displayed image. More preferably, the method further comprises selecting one or more cells in a spreadsheet based on the determined location, wherein the detected user interaction event corresponds to one of: a mouse click, a touch-screen interaction and a key press. Preferably, the method comprises providing, on the display, an indication of a spreadsheet location corresponding to the determined location, wherein the detected user event corresponds to at least one of: a mouse click, a touch screen click, a key press, and a hover event.

BRIEF SUMMARY OF THE DRAWINGS

The invention will be described in more detail by way of example with reference to the accompanying drawings, in which:

FIG. 5 is a representation of an array, the elements each having one of two values;

FIG. 6 is a representation of an array, the elements each having one of three values.

DETAILED DESCRIPTION OF THE INVENTION

Example methods, apparatus, and graphical user interfaces embodying aspects of the invention will now be described with reference to FIGS. 1 to 7.

Figure 1:
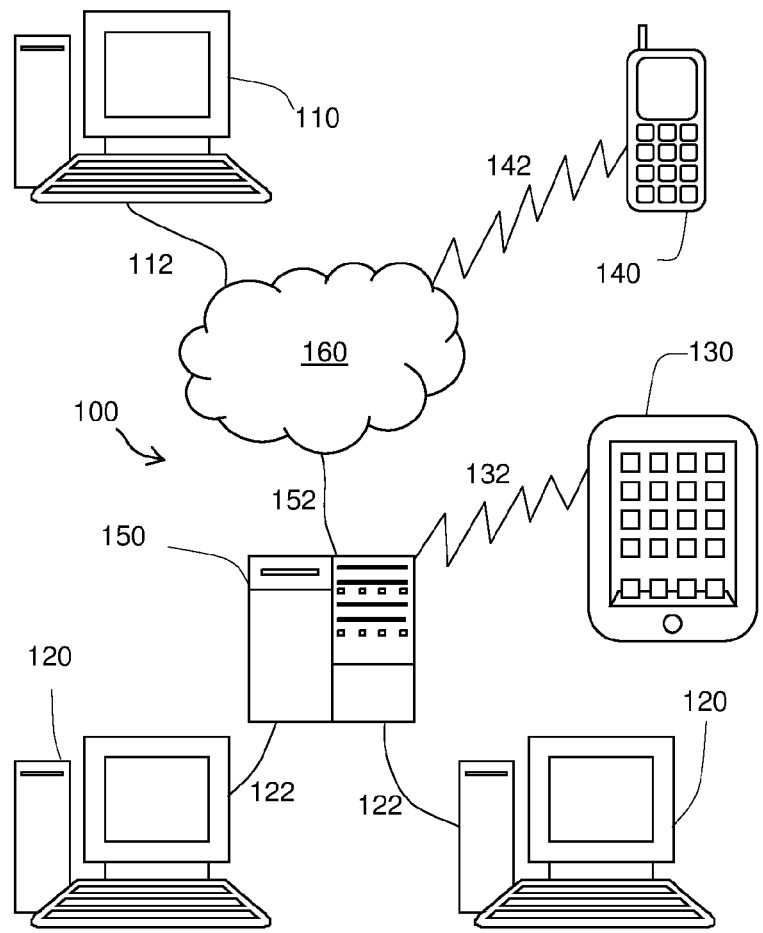
FIG. 1 is a block diagram illustrating a computer system including computer terminals embodying an aspect of the present invention.

FIG. 1 illustrates an example computer system on which a method embodying an aspect of the invention operates. The computer system includes a server 150 to which one or more computer terminals 120 are connected through wired connections 122. The computer terminals 120 are shown as desktop computers. However, they may be other devices such as laptop computers, smart phones or tablet computers. The wired connections 122 may be through Ethernet connections of a local area network. As an alternative to wired connections, the computer terminals 120 may be connected to the server through wireless connections or through connections that have wired and wireless portions. For example, FIG. 1 shows a tablet computer 130 connected to the server 150 through a wireless connection 132. The server 150 is shown as connected to the internet 160 through wired connection 152. This allows other computer terminals that are not in a close enough geographic proximity for direct wired or wireless connection to the server 150 to be connected to the server 150. For example, in FIG. 1, a computer terminal 110 is connected to the internet 160 through wired connection 112. The computer terminal 110 is shown in FIG. 1 as a desktop computer purely as an example. A further example is a cellular phone 140 that is connected to the internet 160 through a wireless connection 142. The cellular phone 140 may be a smart phone.

The server 150 is shown in a local area network with computer terminals 120 directly connected to the server 150 through wired connections 122. Alternatively, the server 150 may be located in a cloud-computing environment. In such cases, the server 150 may be a virtual server running on a virtual machine on a physical server. There may be multiple virtual servers running on virtual machines on a server. According to resource requirements and availabilities, the virtual servers may be scaled up, scaled down, or moved around between physical servers.

Methods embodying aspects of the invention may be performed using an array of data, such as a two-dimensional array. At some points in this disclosure, the letter "D" has been used to indicate dimensions, such as the examples one-, two- and three-dimensions being represented by 1D, 2D and 3D.

The term "array" is used to represent any computer-stored arrangement representative of elements arranged in a grid or table or matrix, such as found in spreadsheet applications or raster images, and is not be considered limited to array data structures or data types. For example, the array may exist in a sparse fashion, such as in a list of non-zero or non-empty locations and values, or as a list of regions of constant value defined by, e.g. corner locations and values. Where the array represents pixel values of an image, the stored array may be in a format that is different to the displayed raster image due to image compression. In the case of spreadsheet applications, the array of data may correspond directly to a portion of a spreadsheet, such that each element of the array is equal to the contents of a spreadsheet cell at a corresponding row-column location. For example, the portion of the spreadsheet may begin at location "A1" but is not required to do so and cover an entire spreadsheet or populated extent of a spreadsheet, or the portion of the spreadsheet may begin at some location offset from "A1".

Alternatively, the elements in the array of data may be indicative of the contents or some aspect of the contents of the cell, such as whether the cell is populated, whether the cell has changed relative to a previous spreadsheet version, whether the cell has changed since the spreadsheet was last saved, whether the cell is different relative to a corresponding cell in some other spreadsheet, whether there is an error in the cell, and/or whether the cell meets some user-definable selection criteria. This may be in a sparse fashion, such as in a list or table of changes. The array may also be an array corresponding to or being reflective of a portion of a 3D array as may be stored in a spreadsheet.

Figure 2A:
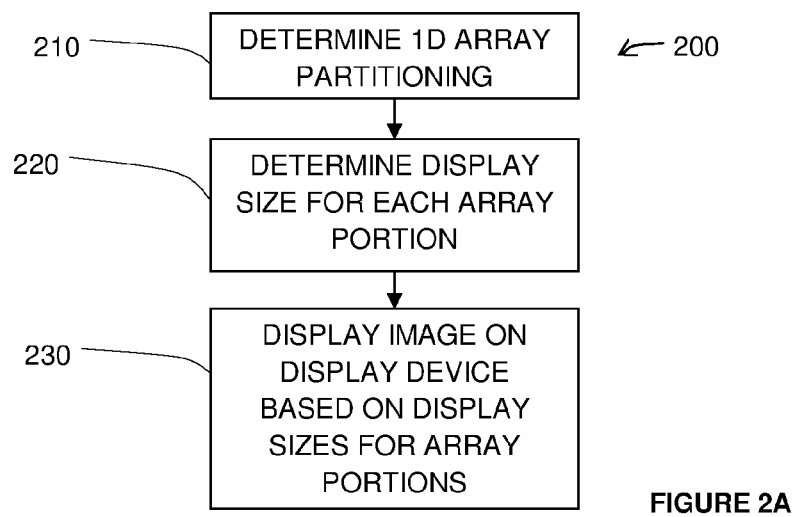
FIG. 2A is a flow diagram illustrating a technique for visualizing an array of data embodying an aspect of the invention.

FIG. 2A is a flow diagram illustrating a method 200 embodying an aspect of the invention. The method comprises a first step 210 of determining a 1D partitioning for an array. The array is partitioned into either array portions of adjacent rows or array portions of adjacent columns, according to the particular dimension of the array in which the 1D partitioning is determined. The next step 220 is to determine a display size for each array portion. The display size is determined separately for each array portion and is based on the size of the array portion. If the 1D partitioning is into array portions of adjacent rows then the size of the array portion may be the number of rows in the array portion or the total number of elements in the array portion, which will be proportional to the number of rows. If the 1D partitioning is into array portions of adjacent columns then the size of the array portion may be the number of columns in the array portion or the total number of elements in the array portion, which will be proportional to the number of columns.

While FIG. 2A shows a determining of a 1D partitioning and determining of display sizes based on the sizes of array portions resulting from the 1D partitioning, and displaying the image based on the determined display sizes, the techniques of this disclosure may additionally comprise determining a different 1D partitioning in a different dimension of the array, determining display sizes for the array portions in the different dimension, and displaying an image based on the array data, each array portion sized in each dimension according to the display sizes determined for each dimension. For example, if the first partitioning of the array is to groups of adjacent rows, then the second partitioning of the array may be to groups of adjacent columns, or vice versa. The resulting image may then be a representation of the array that is nonlinearly scaled in two dimensions.

The display size for each array portion is determined so that smaller array portions are displayed disproportionately large in the resulting displayed image and larger array portions are displayed disproportionately small in the resulting displayed image. Algebraically, this relationship can be represented by the expression, $d(a)/d(b)<a/b$, wherein $d(a)$ and $d(b)$ are the display sizes determined for the largest and smallest array portions respectively, and a and b are the sizes of the largest and smallest array portions respectively.

Additionally or alternatively, the display sizes for each array portion may be determined according to a function such that, for any two pairs of array portions of sizes $s1$ and $s2$, wherein $s1 \leq s2$, and the determined display sizes or the pair of array portions are $d(s1)$ and $d(s2)$ respectively, then the following relationship holds $d(s2)/d(s1) \leq s2/s1$.

Additionally or alternatively, the display size for each array portion may be determined such that the ordering of array portions in size from smallest to largest is maintained in the displayed image. This has the effect that an array portion that is larger than another array portion in the array is not displayed smaller than the other array portion in the resulting image. The subsequent scaling may be regarded as monotonic in that the displayed size is a function of the array portion size, the function being a monotonic function or a non-decreasing function of array portion sizes.

Additionally or alternatively, the display size may be determined by raising the size of the array portion to a power. If the power is greater than 0 and less than 1, e.g. 0.5 for square root, then the largest array portions are reduced relatively in size compared to the smallest array portions, but remain larger than the smallest array portions.

Additionally or alternatively, the display size may be determined by taking a logarithm of the size of the array portion. For example, array portions of sizes 1, 2, 4, and 8 would be converted to 0, 1, 2, and 3 when taking the base-2 logarithm. The resulting values may then be used to determine a display size. For example, the display size can be determined by multiplying the size of the array portion by $(1+\log 2(\text{size of array portion}))$ or by $(\log 2(1+\text{size of array portion}))$, in which the 1 is added to both expressions to account for the fact that log 2(1) is zero. These techniques are not restricted to logarithms to base 2 and may be used with other logarithms to any other value, such as 10 or e, i.e. the base of natural logarithms. The logarithmic approach may be particularly suitable if large differences in sizes of array portions are present.

Additionally or alternatively, the determining of the display size may comprise conditional steps, the performance of which depending on, for example, the array portion size, a calculated display size, and/or a comparison with a reference display size such as a reference display size for an array portion of size 1, i.e. an array portion corresponding to a single row or column. For example, the determining of the display size for an array portion may comprise raising the size of the array portion to a power and, if the determined array size is less than a minimum size for an array portion of size 1, then the determined display size may be limited to the minimum size, to ensure that the determined display size does not decrease with increasing array portion size.

Additionally, the determining of the array size may comprise performing further operations, including but not limited to one or more of adding, subtracting, multiplying and dividing a value to or from an array portion or the result of any operation described above in the determining of a display size.

Determining display sizes for array portions may be an iterative process. For example, where display sizes for array portions are determined by raising to a power an array portion size, such as a number of rows in a row range, then the power may be varied until display sizes are determined such that an image based on the display sizes would fit within a display region on the display device. For example, the power may be reduced in steps from an initial value to a minimum value, such as from 0.95 to 0.3. If it is found that the image based on the display sizes is smaller in size than a display region on the display device then the image may be linearly scaled to ensure that the display region is filled. In the case of logarithmic scaling, the logarithmic base may be varied.

The next step 230 is to display an image on a display device. The image is constructed with array portions located adjacent each other and arranged in the ordering of the array. The sizes of the array portions are sized in the image according for the display size determined for the respective array portion.

The determined display sizes for the array portions may be non-integer values which may mean that the image may be required to be displayed with non-integer values as co-ordinates for different image portions. Many graphical rendering environments and frameworks are able to accommodate non-integer values in this way but rounding may be necessary otherwise.

To ensure that display sizes are a non-decreasing function of array portions sizes, it may be necessary to round consistently in one direction, such as by using a 'floor' function, converting the number to be rounded to the largest integer not greater than the number to be rounded, or a 'ceiling' function converting the number to be rounded to the smallest integer not less than the number to be rounded.

Figure 3A:
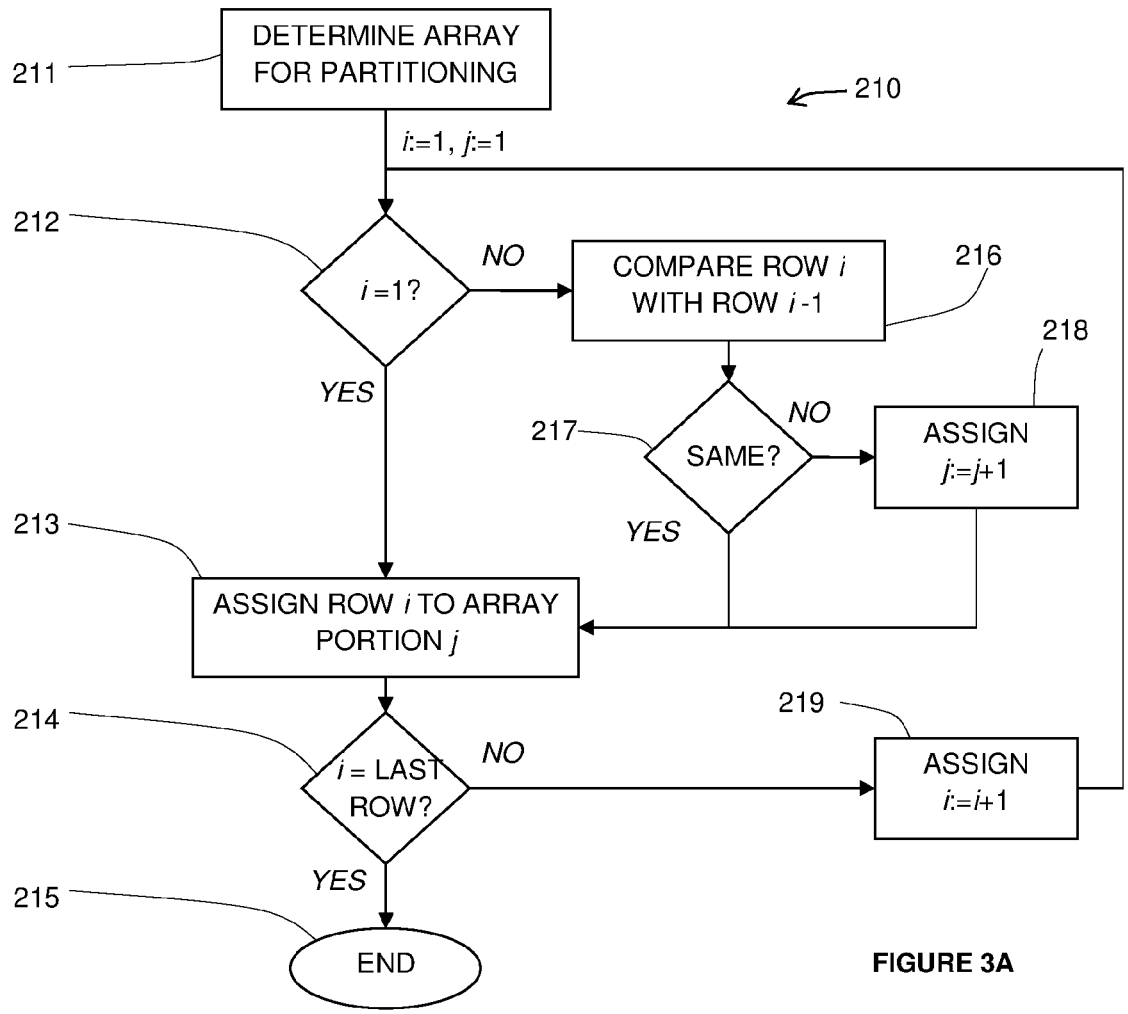
FIG. 3A is a flow diagram illustrating a technique for determining an array partitioning of an array of data for visualizing the array of data, the array partitioning being to array portions of adjacent rows.

FIG. 3A shows a step 210 of determining a 1D array partitioning in more detail, in which an array is partitioned into array portions of adjacent rows. In a first step 211, the array for partitioning is determined. Indices i and j, are initialized to 1 (where 1 indicates the first element in a sequence—they could alternatively be initialized to 0 in zero-based numbering). Indices i and j are used to track a current row and array portion respectively as the method advances across the across the array. At step 212, a check is made as to whether i=1, i.e. whether this is the first pass through the method. If so, at step 213, row i is assigned to array portion j, i.e. the first row is assigned to the first array portion. If not, at step 216, row i is compared with row i−1, i.e. the previous row. This may be on an element-by-element basis. Step 217 considers whether the rows are the same; if so, at step 213, row i is assigned to array portion j, i.e. the current row is assigned to the current array portion to which the previous row also belongs. If not, j is incremented at step 218, advancing to the next array portion. Then, at step 213, row i is assigned to array portion j, i.e. the current row is assigned to the current (new) array portion to which the previous row does not also belong. Once the row i is assigned at step 213, a comparison is made at step 214 to see whether row i is the last row in the array. If so, the method ends at step 215. If not, the method advances to step 219, incrementing i and so advancing to the next row, before returning to the comparison at step 212.

Figure 3B:
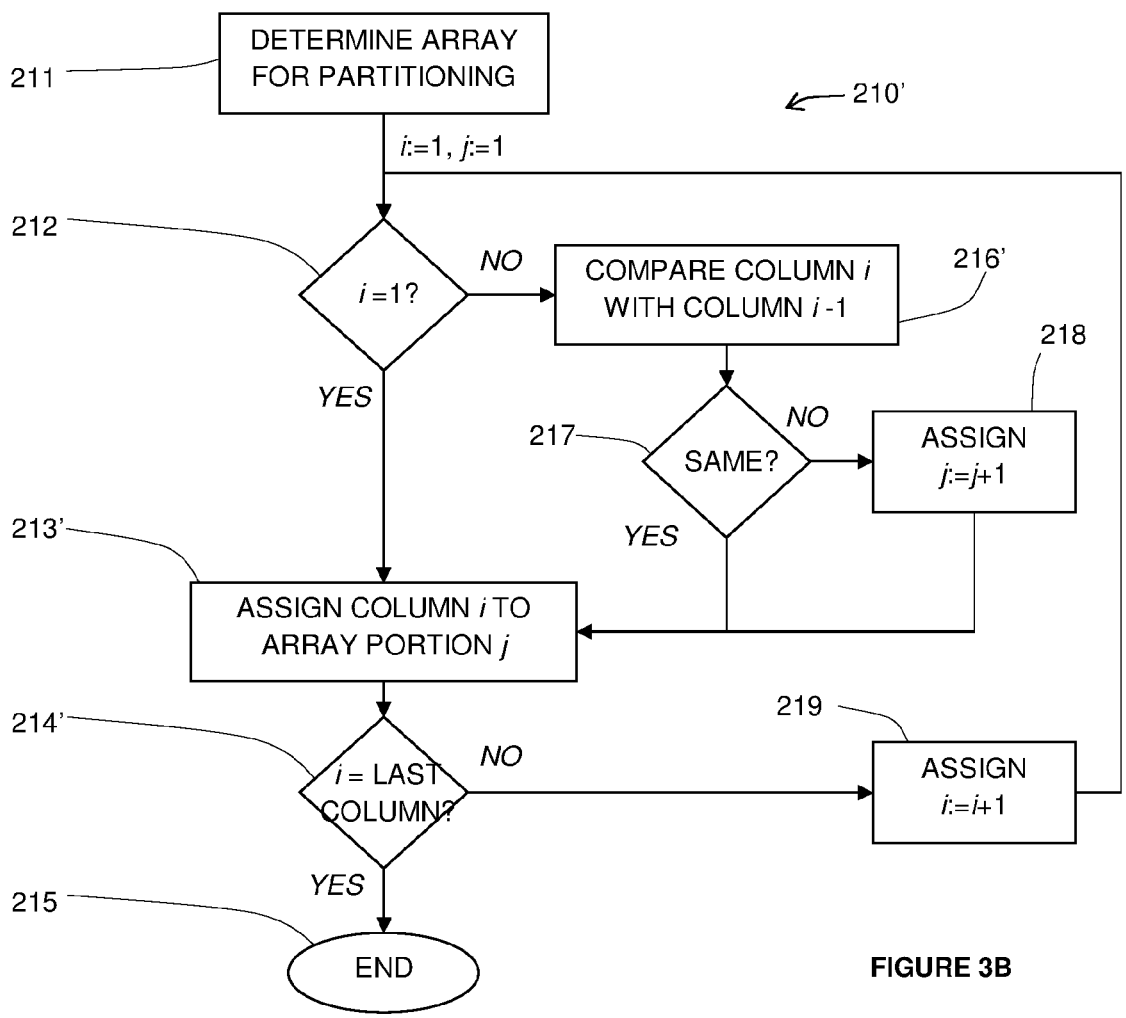
FIG. 3B is a flow diagram illustrating a technique for determining an array partitioning of an array of data for visualizing the array of data, the array partitioning being to array portions of adjacent columns.

FIG. 3B shows an alternative step 210' of determining a 1D array partitioning in more detail, in which an array is partitioned into array portions of adjacent columns rather than rows as shown in FIG. 3A. In a first step 211, the array for partitioning is determined. Indices i and j, are initialized to 1 (where 1 indicates the first element in a sequence—they could alternatively be initialized to 0 in zero-based numbering). Indices i and j are used to track a current column and array portion respectively as the method advances across the across the array. At step 212, a check is made as to whether i=1, i.e. whether this is the first pass through the method. If so, at step 213', column i is assigned to array portion j, i.e. the first column is assigned to the first array portion. If not, at step 216', column i is compared with column i−1, i.e. the previous column. This may be on an element-by-element basis. Step 217 considers whether the columns are the same; if so, at step 213', column i is assigned to array portion j, i.e. the current column is assigned to the current array portion to which the previous column also belongs. If not, j is incremented at step 218, advancing to the next array portion. Then, at step 213', column i is assigned to array portion j, i.e. the current column is assigned to the current (new) array portion to which the previous column does not also belong. Once the column i is assigned at step 213', a comparison is made at step 214' to see whether column i is the last column in the array. If so, the method ends at step 215. If not, the method advances to step 219, incrementing i and so advancing to the next column, before returning to the comparison at step 212.

Alternatively, if the array is stored in a computer system in a sparse format, such as with a list of non-zero entries, it may be more efficient to only consider non-zero locations in the array. This may reduce the number of element comparisons that are necessary. An example of such a process is shown in the pseudocode of Table 1 below, wherein the array is partitioned into array portions of adjacent rows (row ranges) based on a list of non-zero elements of interest within the array. While this pseudocode refers to non-zero elements, these methods are also applicable to arrays in which the elements are specified or selected in some other manner.

TABLE 1 column processing

```
For each column with non-zero elements
    Create an output list for the column
    Sort non-zero elements in ascending order of row
    Iterate through every non-zero element using a local variable to track
    working row range
        If not first non-zero element
            If current non-zero element's row is equal to the end row of
            working row range + 1
                Increment end row of the working row range
            Else
                Add working row range to output list for this column
                Create a new working row range with the row of the
                current non-zero element as start and end row
        Else
            Create a new working row range with the row of the current
            non-zero element as start and end row
```

This results in a list of row ranges for each column. The row ranges are subsequently split so that they align across rows, i.e. so that columns have the same ranges. The existing row ranges are sorted by start row and end row. The process iterates through each row range in each column as shown the algorithm represented by the pseudocode of Table 2 below:

TABLE 2 row range normalizing

```
Iterate through each row range in each column
    If row range is in output
        Update the list of columns on the row range and add this column
    Else
        Add this row range to the output
For each row range
    Get last outputted range
    If thisRange start row <= lastRange's end row
        If thisRange start row = last range start row
            If thisRange end row > last range end row
                Update the last outputted range to include this row range's
                columns
                Output new range starting at lastRange endRow + 1 and ending at
                thisRange end row with thisRange columns
            Else if thisRange end row < lastRange end row
                Update lastRange end row to thisRange end row
                Update lastRange columns to include thisRange columns
                Output new range starting at thisRange end row + 1 and ending at
                lastRange end row with lastRange columns
            Else if thisRange end row = lastRange end row
```

TABLE 2-continued row range normalizing

```
        Update lastRange columns to include thisRange columns
    Else if thisRange start row > lastRange start row
        Update lastRange end row to thisRange start row −1
        If thisRange end row = lastRange end row
            Output new range starting at thisRange start row and ending at
            this range end row with both thisRange and lastRange columns
        Else if thisRange end row > lastRange end row
            Output new range starting at thisRange start row, ending at
            lastRange end row with both thisRange and lastRange columns
            Output new range starting at lastRange end row + 1, ending at
            thisRange end row and with thisRange's columns
        Else if thisRange end row < lastRange end row
            Output new range with thisRange start row, ending at thisRange
            end row with both thisRange and lastRange columns
            Output new range starting at thisRange end row + 1, ending at
            lastRange end row and having lastRange's columns
        Else if thisRange start row < lastRange end row
            From the end of the output move any ranges which have start or end
            row after thisRange's into the remaining ranges while maintaining the
            sort order
            Restart the loop starting from thisRange and keeping the existing
    Else
        Output new range with thisRange start row, ending at thisRange end row with
        thisRange columns
```

Figure 4:
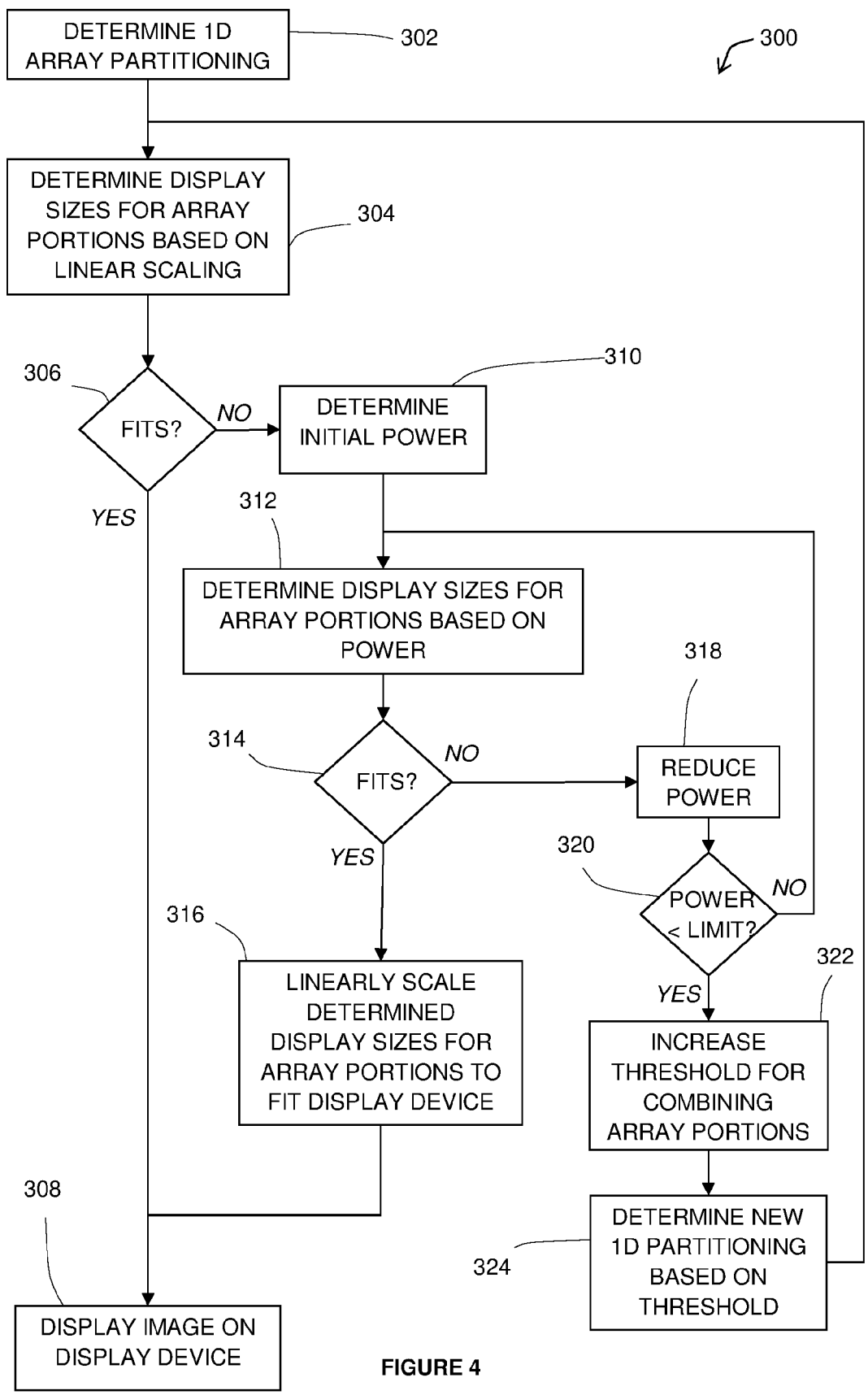
FIG. 4 is a flow diagram illustrating a technique for visualizing an array of data embodying an aspect of the invention.

FIG. 4 is a flow diagram illustrating a method 300 embodying an aspect of the invention, in which display sizes for array portions are determined iteratively based on a power scaling, the power scaling being carried out after determining that an image based on display sizes for array portions deriving from a linear scaling would not fit within the display region of the display device if a minimum displayed size of an array portion is enforced. If after iteratively reducing the power to a limit it is found that the an image based on display sizes for array portions deriving from the power scaling would not fit within the display region of the display device, then adjacent array portions are combined if the sum of the sizes of the array portions is less than a threshold, and the process repeats, first with linear scaling, then iterative power scaling. At the first step 302, the 1D array partitioning is determined. Next, at step 304, display sizes are determined for the array portions based on linear scaling, the display sizes of array portions being subject to a minimum display size. At step 306, it is checked whether the resulting image of the linear scaling would fit within a display region. If so, then the image is displayed on the display device at step 308. If not, then an initial scaling power is determined at step 310, such as 0.95. Then, at step 312, display sizes are determined for array portions based on the scaling power, subject to minimum display sizes for array portions. At step 314, it is checked whether the resulting image of the power scaling would fit within the display region. If so, then at step 316 the display sizes are linearly scaled upward to fill so that the image would fill the display region and at step 308 the image is displayed on the display device. If not, then at step 318 the scaling power is reduced, such as by 0.05. If the reduced scaling power is not below a limit, such as 0.3, then the method returns to step 312 to determine display sizes for the array portions based on the reduced scaling power, subject to minimum display sizes for array portions. If the reduced scaling power is below the limit, then at step 322 a threshold is increased for combining array portions, or introduced if the method is on a first pass. Then at step 324, a new 1D partitioning is determined based on the threshold, adjacent array portions being combined when the sum of the sizes of the array portion is below the threshold. Then the method returns to step 304, determining display sizes for linear array portions including combined array portions based on linear scaling, subject to minimum display sizes for array portions.

Methods embodying an aspect of the invention may include some or all of the steps shown in FIG. 4. For example, the linear scaling may be omitted and/or the combining of array portions based on a threshold may be omitted.

Example methods and apparatus embodying an aspect of the invention may be in the context of a system for monitoring and auditing data in one or more spreadsheets, or in methods of monitoring and/or auditing data in one or more spreadsheets. Examples of such systems are described in published international patent applications WO 2005/081126 A2 and WO 2008/015395 A2. In such systems, by storing suitable data within the database, it may possible to construct a complete history of all changes made to an individual spreadsheet. The entire contents of WO 2005/081126 A2 and WO 2008/015395 A2 are hereby incorporated by reference.

The one or more spreadsheets may be contained within files stored on a file store. The file store may be constituted in many different forms in different embodiments of the invention, and it may include many different components. For example, it may include one or more of a server 150 and a computer terminal 110, as shown in FIG. 1, and/or a workstation computer. Components of the file store may be at diverse locations and interconnected by local-area or wide-area network links. The system may include a monitoring means operative to continuously detect changes in spreadsheet data within the file store and record the changes in a database, the changes including changes in formulas in cells of the spreadsheet monitors the files in the file store. Likewise, the monitoring means may access the file store using local-area links, such as through wired connections 122 or wireless connections 132, or wide-area network links, via wired connections 112 or wireless connections 142, including through access through the internet 160. The monitoring means most preferably includes a file location module that searches the file store for spreadsheets that are to be monitored. The monitoring means includes comparison means operative to compare a file in the file store (the current file) with a previous version of that file. This enables the system to determine the differences between successive saved versions of the same file. More specifically, the comparison means compares each cell in the current file with a corresponding cell in the previous version and, if it is determined that the content of the cell has changed, create a record of that change. Thus, changes can be recorded on a cell-by-cell basis. The record thereby created includes data that characterises the nature of the change. Such a record can be inspected to obtain a qualitative understanding of the nature of the changes made to the spreadsheet file. The nature of the change may be classified as being one or more of: data added, data changed, data deleted, function added, function changed, function deleted, data to function, function to data, cell error, function recalculation, script changes, external reference changes, named range changes, link changes, password changes, sheet added, sheet deleted, sheet renamed, spreadsheet renamed, spreadsheet deleted, spreadsheet added. It will be understood that not all embodiments may include all of these classifications and that some embodiments may include further classifications not listed here. The record may include additional data, such as a time stamp that indicates when the change was made and the identity of a user who made the change.

The monitoring of changes or other information in a worksheet can be displayed visually through generating and displaying an image to the user, the image showing the locations of certain information in the worksheet, such as the cells in which changes have taken place. Such an image is sometimes termed a 'minimap'.

In a method embodying an aspect of the invention, a fixed display area is used for the minimap so that the entirety of the populated area of the worksheet can be visualized. The method increases the visibility of single cells. The visibility of single cells may be achieved by assigning single cells a minimum size. The method visualizes the whole populated area and not just the populated area in which changes have occurred, since this provides the user a more complete impression as to where the changes are located in the populated area of the worksheet. Other embodiments may display only a portion of the populated area at a time in the minimap where it is considered that the information being displayed does not benefit from having that context visually. For example, other embodiments may display only a portion of the columns of the populated area at a time, the remainder being reachable via, for example, a left-right scroll bar. The method also sets the starting point of the minimap (e.g. the top-left corner) to be the first absolute row/column, since users are accustomed to looking at data from that point.

The method operates on change information of the worksheet, i.e. cells in which changes have occurred, but could also be performed on other information such as populated cells or cells matching a certain condition, such as a user-defined condition. Within each column, contiguous changes are combined, allowing the method to operate on ranges of the worksheet rather than individual cells. This allows the use of ranges as the worksheet unit rather than cells.

Figure 2B:
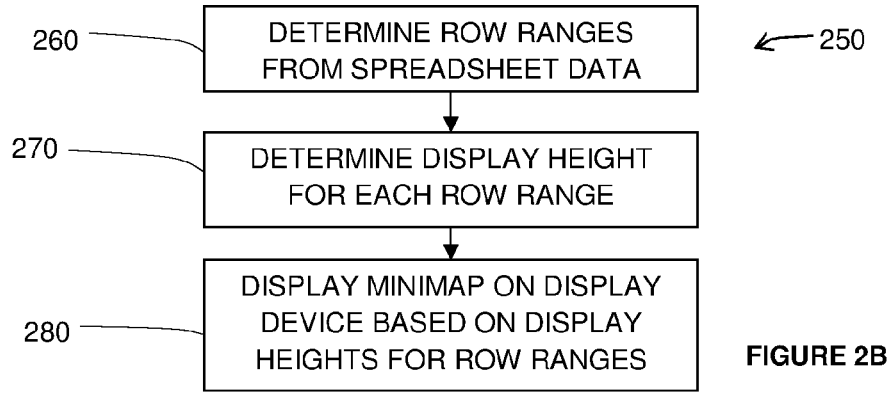
FIG. 2B is a flow diagram illustrating a technique for visualizing an array of data embodying an aspect of the invention

FIG. 2B is also flow diagram illustrating a method 250 embodying an aspect of the invention, in which the method is applied to spreadsheet data and adjacent rows are combined to form array portions, here termed row ranges. The row ranges form a contiguous non-overlapping partitioning of the spreadsheet data that is to be visualized. In a first step 260, row ranges are determined from spreadsheet data. In the next step 270, a display height is determined for each range, the display size being a display height for this embodiment. In the next step 280, a minimap is displayed on the display device based on the display heights determined for each row range of the spreadsheet data.

Figures 5, 6:
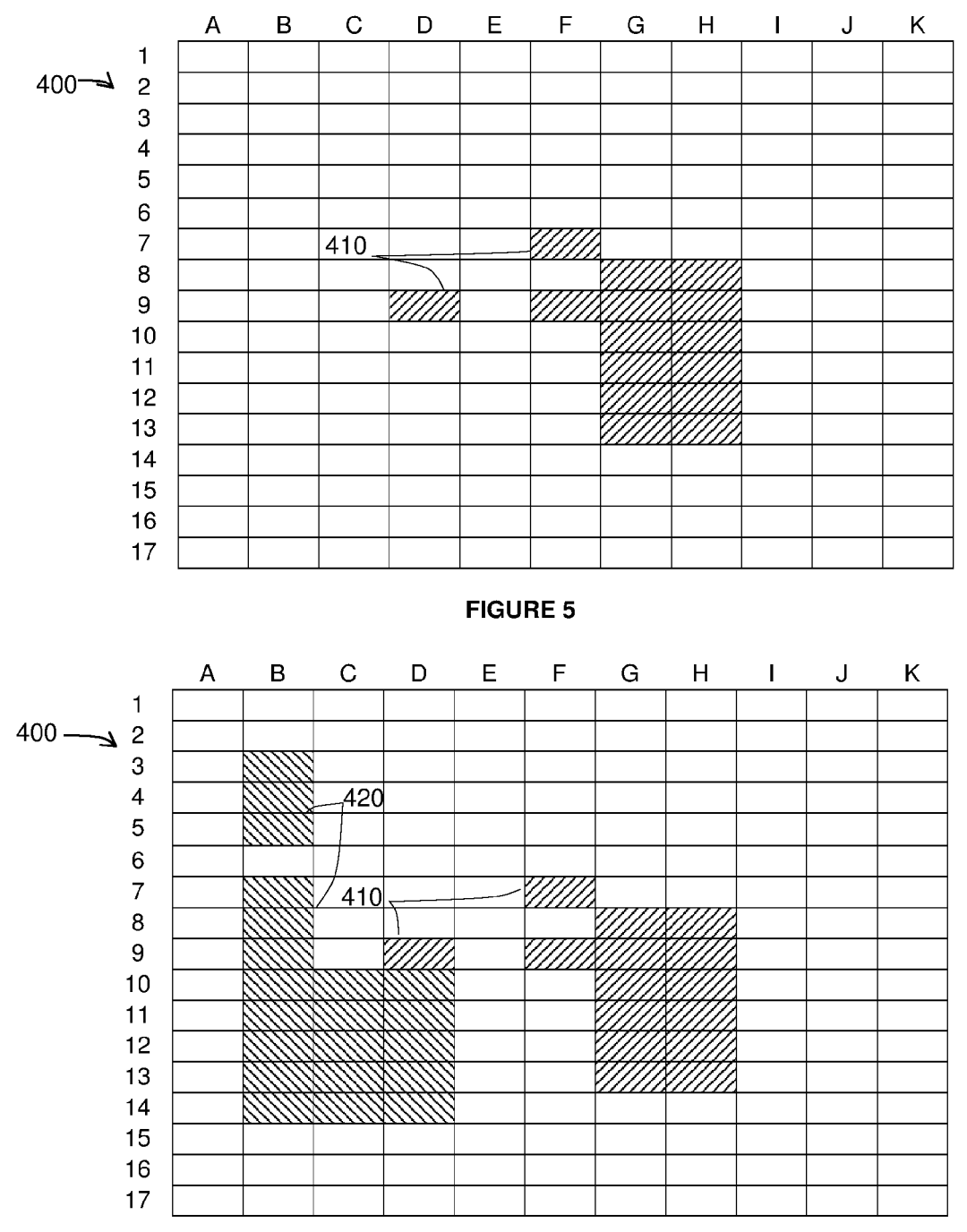

FIG. 5 shows a simple example where all changes are visible in a small area. In the array 400, shaded cells 410 represent changes. In this case, the ranges would be combined within each column to form contiguous ranges as Column D: rows 9-9, Column F: rows 7-7, 9-9, Column G: rows 8-13, and Column H: rows 8-13.

The next step is to 'normalize' the ranges so that each column has the same ranges. This may be carried out according to the algorithms shown in Tables 1 and 2 above. Since this might produce extra ranges in some columns which have not changed, this information would need to be stored against each range. For a more condensed representation, changed columns can be stored against each row range, as shown in Table 3 below.

TABLE 3 changed columns stored against row ranges

| Row Range | Changed Columns |
|---|---|
| 7-7 | F |
| 8-8 | G, H |
| 9-9 | D, F, G, H |
| 10-13 | G, H |

The next step is to add to the representation shown in Table 3 any unchanged row ranges, i.e. row ranges in which no changes exist. For the example shown in FIG. 5, this would result in the contiguous ranges shown in Table 4 below.

TABLE 4 changed and unchanged columns stored against row ranges

| Row Range | Changed Columns |
|---|---|
| 1-6 | |
| 7-7 | F |
| 8-8 | G, H |
| 9-9 | D, F, G, H |
| 10-13 | G, H |
| 14-17 | |

The next step is to calculate how many display units are available per range. Because the ranges are the same across all columns, this calculation can be carried out for a single column and applied across all other columns. In an example, a display is available of height 300 pixels and width of 928 pixels. In calculating the how many display units are available per range, a minimum visible area for single-cell ranges is ensured and that the allocated display height per range increases with range length. This limitation is helpful in avoiding user confusion that might arise if a bigger range appears to have less height than a smaller range. It has been found that satisfactory results are obtained when the minimum number of pixels for a single cell, in terms of displayed height, is 3.

The calculation is carried out using an iterative mechanism for finding an optimal allocation of pixel height per column, starting from a linear allocation and then moving on to one or more allocations based on progressively more aggressive power scaling.

For the linear iteration, the calculation is carried out according to the algorithm represented by the pseudocode in Table 5 below.

TABLE 5 linear iteration algorithm

For each row range: range height = (min pixels for single cell) * (num rows in range)
Sum all range heights
If sum < available display height then
    secondary scale factor = available display height / sum of all range heights
Else
    secondary scale factor = 1
For each row range: display height = (range height) * (secondary scale factor)

If it is found that the sum of all range heights is greater than the available height the calculation switches to power scaling with the calculation carried out according to the algorithm represented by the pseudocode of Table 6 below. An initial power scaling factor is adopted, which may be any value less than 1. In this case, 0.95 is adopted.

TABLE 6 power scaling algorithm

Set power scaling factor = 0.95 (initially, then reducing each iteration)
For each row range:
    If num rows in range = 1 then
        range height = min pixels for single cell if range has one row
    Else
        Scaled range height = (num rows in range) ^ (power scaling factor)
        Range height = maximum(scaled range height, min pixels if range has more than one row)
Sum all range heights A scaled range height is obtained by raising the value given by the number of rows in the range by the power scaling factor. To ensure that the height of the outputted range is not less than a predefined minimum number of pixels for a range having more than one row, this is limited by taking the maximum of this result and the minimum number of pixels if the range has more than one row. It has been found that satisfactory results are obtained if the minimum number of pixels for a range having more than one row is equal to 6. If the minimum number of pixels for a range of a single cell is 3, this allows a noticeable difference between single row ranges and multiple row ranges to be readily discerned by a minimap user.

If the total range height is found to be more than the available space then the power scaling routine can be retried repeatedly with smaller power scaling factors until a minimum power scaling factor is reached. It has been found that satisfactory results are obtained with 0.3 as the minimum power scaling factor, each iteration reducing the power scaling factor by 0.05 from the initial 0.95.

If the total range height calculated according to the power scaling factor is less than the available space, then a secondary scaling factor is calculated according to Table 7 below and this is used to resize each range to use the available space more effectively.

TABLE 7 rescaling algorithm

Secondary scale factor = available height / sum of height of all ranges
Multiply each range with the secondary scale factor If the minimum power scaling factor is reached and the ranges still do not fit within the available display area, i.e. the sum of all range heights is greater than the available display height, then the number of ranges to be displayed is reduced.

To reduce the number of ranges to be displayed, adjacent changed and unchanged ranges are combined. To distinguish such ranges on the minimap, a different highlighting is used to alert the user to the fact that range combination has been used and to the particular ranges on which it has been used. To do this, ranges are combined when they fall within a threshold row count and the combined ranges are marked as mixed. This is carried out according to the algorithm represented by the pseudocode of Table 8 below.

TABLE 8 range combination algorithm iterate through every column
    var output
    iterate through every row range in the column's row ranges using an accumulator to track working row range
        if we have a working row range (handles first row range)
            if current row range falls within the bounds of working row range extended by the threshold
                set the working row range to be extended up to the current row range's end row
                set the row range type to indicate this range is "mixed" and covers unchanged row ranges
            else
                put the working row range into the output
                set the working row range to current row range
        else
            set current row range as working row range on the accumulator
    if we have got a working row range left over then add it to the output
    replace column's row ranges with output It has been found that satisfactory results are obtained when the initial threshold for combining rows is 2 and, if this threshold is not sufficient, subsequent thresholds are selected in order from the sequence 2, 5, 10, 20, 50, 100, 200, 500 etc, i.e. the 1-2-5 series.

Once the range-combination process has been carried out using the threshold, the display unit calculation is retried, first using a linear scaling then power scaling from 0.95 to 0.3. If the ranges still do not fit within the available display area, then the threshold for combining ranges is increased and the threshold combining algorithm carried out again. This process is iterated with the threshold increasing until the ranges are found to fit in the available display area.

In this embodiment, the nonlinear scaling approach using power scaling described above is only performed in the vertical direction for the scaling of row heights. The column widths can be scaled linearly to fit within the available display area. In other embodiments, a fixed column width is used and a horizontal scroll bar is present to allow the user to navigate left and right between columns.

The ranges are then rendered to the display area using the ranges thus obtained. In an example, mixed ranges comprising row ranges in which no change has taken place and row ranges in which changes have taken place, combined according to the range combination algorithm set out in Table 8, may indicated in the display area using a different colour or shading intensity. For example, if cells in which changes have taken place are rendered a dark colour, and cells where no changes have taken place are rendered white, then cells corresponding to combined ranges of cells in which no changes have taken place and cells in which changes have place are rendered an intermediate colour or rendered with hatching lines of black and white or a dark colour and a light colour.

The method described above can be used to draw one or more visualizations in the same display. The user may choose what information to render in this manner by means of selection controls in the vicinity of the display. Some examples of information which can rendered in this manner include areas within a worksheet with populated cells, areas within a worksheet where the cells have formulas; and areas within a worksheet where the cells match specific conditions (e.g. having a hard-coded value in a formula).

The display of such information is not restricted to just using fill colour and could additionally or alternatively use hatching lines, borders, a texture mapping, or any other graphical indication. This can be one way of showing more than one type of information simultaneously.

In some cases, the use of multiple colours allows the information to be displayed in a richer fashion using appropriate mapping of information to a scale. In an example, different colours are specified for changed cells based on the kind of change, such as addition, deletion, modification, by including this information about the ranges during the calculations above.

FIG. 6 shows a more complicated example where all changes are visible in a small area of the array 400, but in this case there are two types of changes present (e.g. addition and deletion), the first type 410 being indicated by a diagonal hatching from bottom-left to top-right, the second type 420 being indicated by a diagonal hatching from bottom-right to top-left. In this case, the ranges would be combined within each column to form contiguous ranges as Column D: rows 9-9, Column F: rows 7-7, 9-9, Column G: rows 8-13, and Column H: rows 8-13. In a similar fashion as with a single type of change, the changes for each of the change types are stored as changed and unchanged columns against row ranges as shown in Table 9.

TABLE 9 changed and unchanged columns stored against row ranges for two change types

| Row Range | Type 1 Changed Columns | Type 2 Changed Columns |
|---|---|---|
| 1-2 | | |
| 3-5 | | B |
| 6-6 | | |
| 7-7 | F | B |
| 8-8 | G, H | B |
| 9-9 | D, F, G, H | B |
| 10-13 | G, H | B, C, D |
| 14-14 | | B, C, D |
| 15-17 | | |

While FIG. 6 and Table 9 show an example with two types of changes, the present disclosure is not limited to two types of changes. Changed and unchanged columns can be stored against row ranges one type of change or for more than one type of change, such as the three types mentioned above: addition, deletion, modification.

While these examples have been directed to the visualization of changes in cells, this disclosure is not limited to changes in cells. Instead of changes in cells, methods embodying an aspect of the invention may visualize, for example, areas within a worksheet with populated cells, areas within a worksheet where the cells have formulas; and areas within a worksheet where the cells match specific conditions (e.g. having a hard-coded value in a formula).

Figure 7A:
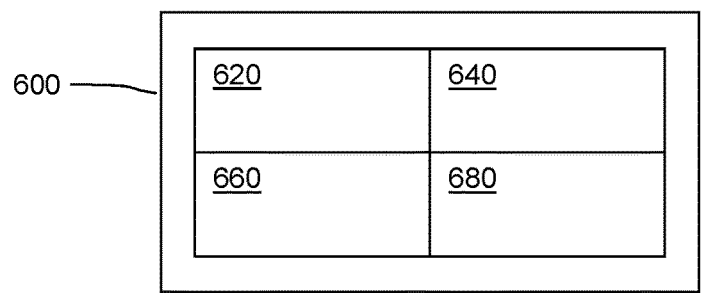
FIG. 7, comprising FIGS. 7A (overview), 7B (left-hand side), and 7C (right-hand side), illustrates a graphical user interface embodying an aspect of the invention.
Figure 7B:
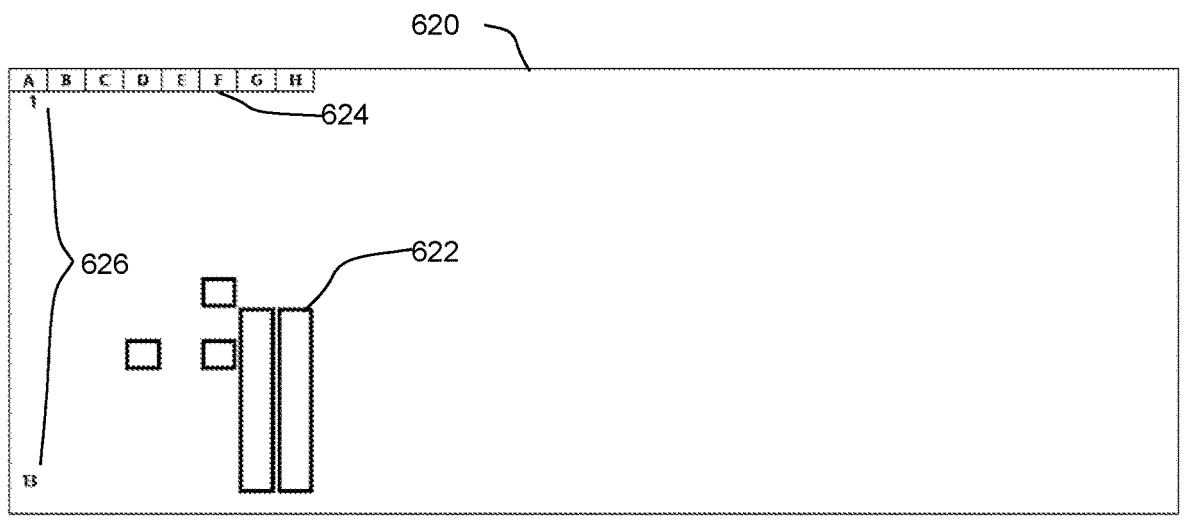

FIG. 7, comprising FIGS. 7A (overview), 7B (left-hand side), and 7C (right-hand side), illustrates a graphical user interface (GUI) 600 embodying an aspect of the invention, the graphical user interface being part of a system for monitoring and auditing data in one or more spreadsheets. The GUI 600 divides a display quarterly into four portions: a minimap 620, a change list 640, a spreadsheet 660 and a reference spreadsheet 680. The change list 640 details all changes between the spreadsheet 660 and the reference spreadsheet. The change list 640 is here shown in the form of a table showing, for each change, a cell location, a change type, the value or contents of the cell, and formula if present. Where the change relates only to a portion of the cell contents, the changed portion is highlighted. The minimap 620 covers all populated cells, in this case columns A to H and rows 1 to 13. The column scale 624 allows the user to contextually appreciate a column location relative to the populated area. The row scale 626 is here represented by 1 and 13, intermediate values being omitted. In other embodiments intermediate values may be included, the spacing between the intermediate values in the row scale 626 being determined appropriately. The minimap 620 shows cell ranges 622 corresponding to the changed cells between the spreadsheet 660 and reference spreadsheet 680 as detailed in the change list 640. The relative sizes of the cell ranges, in particular, the row heights, are determined by methods described herein.

The calculations that take place to determine the displayed cell sizes for the minimap are performed on a continuous basis in response to cell changes. In other embodiments, the minimap is updated periodically or in response to operations including one or more of: opening a spreadsheet, performing a comparison between spreadsheets, performing a comparison between versions of a spreadsheet, and a user interaction.

In some embodiments, the minimap provides a visual indication of the currently selected cells in the worksheet. For example, the cells in the minimap corresponding to the currently selected cells may be shaded differently or have a different border. This may be updated when a user changes their cell selection in the worksheet. This may not necessarily require the cell display heights to be recalculated.

In some embodiments, the minimap may act as a navigation tool to allow a user to navigate to various parts of the worksheet, wherein a user may click or otherwise perform an operation to select a particular point on the minimap. Suitable user-interaction alternatives for selecting a particular point on the minimap include a touch-screen interaction and a key press. The position co-ordinates of the point selected by the mouse click or otherwise performed selection operation is translated to a cell row and column value. To derive the row position, the range size in displayed units is mapped linearly to the range size in rows. Applying this linearly rather than reversing any power scaling applied provides a result closer to a user's intuition as the middle of a range on the display may map to the middle of the range in row terms. The column position may be derived more simply on account of their fixed widths. Following the click or otherwise performed selection operation, the current selection in a spreadsheet may be updated based on the determined cell row and column value of the position co-ordinates of the point selected by the click or otherwise performed selection operation. In the graphical user interface 600 of FIG. 7, this may be the spreadsheet 660 or reference spreadsheet 680. The user may be navigated to the determined location in one or more current or previous versions of the spreadsheet. This may include opening a spreadsheet that is not currently open and navigating directly to the determined location in the newly opened spreadsheet.

In some embodiments, the display supports hover capabilities via a device such as a mouse. Without clicking the mouse on the minimap, the display provides the corresponding row and column coordinates of the current mouse pointer position on the minimap. The same calculation applied for the click navigation can be used to determine the co-ordinates and display them to the user on a visual aid such as a tooltip.

In some embodiments, a secondary visualization is also shown on the minimap which overlays other information. The secondary visualization may provide details of areas covered by a particular kind of 'control', areas which have been explicitly included from change analysis, and/or areas for which a 'name' has been defined. Alternatively or additionally, the secondary visualization may be used to provide an indication of areas within a worksheet with populated cells, areas within a worksheet where the cells have formulas; and areas within a worksheet where the cells match specific conditions (e.g. having a hard-coded value in a formula). If the minimap is not used to visualize cells in which changes have occurred, then this information could alternatively or additionally be displayed using such a secondary visualization. The secondary visualization may be implemented by the drawing of a transparent rectangle with visible border providing this information as an overlay on top of the display area. Properties of the border such as colour, line thickness, or line style (e.g. dashed, dot-dashed etc) may be varied according to the information represented by the secondary visualization.

Other methods embodying an aspect of the invention relate to image processing. A raster or bitmap representation of an image stores a plurality of pixel values in a 2-dimensional array, or in a three-dimensional array for RGB format. As an example, a black and white (1-bit per pixel) representation of an image shares many similarities with the worksheets described above in the visualization of a single type of change in worksheet cells. The methods of this disclosure may be applied to such images to non-linearly reduce the size of the images for display on a display device of limited resolution or to increase the visibility of noise or image blemishes. In some methods embodying an aspect of the invention, a full-colour image such as a photograph may be converted to two-colour (i.e. black and white only) by applying one or more thresholds to the pixel values of the image, the pixel values being converted to black or white depending according to comparisons with threshold values, and the methods of this disclosure may be applied to the resulting black and white images. In these examples, the colours black and white have been used as examples but the methods are not limited to these colours only. For example, the methods are operable on images containing two colours or more than two colours, which may optionally include black and white but the two or more colours are not required to include black and white.

Other methods embodying an aspect of the invention may relate to the display of sparsity patterns of matrixes or tables. This may be implemented in a mathematical computing environment such as MATLAB™ of MathWorks or Mathematica™ of Wolfram Research. Other methods embodying an aspect of the invention may relate to the display of calendar events, the calendar being represented by a 2D array with, for example, each row representing a week, month, year or some other period. Other methods embodying an aspect of the invention may relate to the graphing of data in the form of scatter graphs, wherein adjacent data points may be combined to form ranges.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. In the context of this disclosure, the term "based on" does not mean "based only on," unless expressly specified otherwise. In other words, the term "based on" describes both "based only on" and "based at least on." The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The methods, process and algorithms that have been described may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. In the context of this disclosure, the term "code" may refer to software, instructions, code or data that is/are executable by a computing device or processor.

Software or instructions or data may also be transmitted over a transmission medium. For example, if the software is transmitted from a website, server, or other remote source using a coaxial cable, fibre optic cable, twisted pair, digital subscriber line (DSL), or wireless technologies such as infrared, radio, and microwave, then the coaxial cable, fibre optic cable, twisted pair, DSL, or wireless technologies such as infrared, radio, and microwave are included in the definition of transmission medium.

This disclosure has referred to a display device. The term "display device" refers to any device for presentation for presentation of information. Typically the information displayed is supplied to the display device as an electrical signal, such as by varying voltages and/or currents in at least one wire or by variations in electromagnetic radiation; in such cases, the display device may be termed an electronic display device. This is typically a device for presentation of information in visual form, such as in an electronic visual display, but may also be in tactile form, such as in a tactile electronic display. By way of example, and not limitation, such a display device may comprise a cathode ray tube display (CRT), a light-emitting diode display (LED), an electroluminescent display (ELD), electronic paper (also known as E-Ink), a plasma display panel (PDP), a liquid crystal display (LCD), a High-Performance Addressing display (HPA), a thin-film transistor display (TFT), a lenticular display or an organic light-emitting diode display (OLED). The term display device should not be considered limited only to display devices readily available on the marketplace in 2015, and may comprise display devices according to emerging technologies including, but not limited to, a surface-conduction electron-emitter display (SED), a field emission display (FED), a laser video display, a carbon nanotube display, a quantum dot display, and an interferometric modulator display (IMOD). A display device may have the form of a television set or computer monitor or head-mounted display or a projector, such as a digital video projector. A display device may be integral to another electronic device. For example, the display device may be part of a mobile phone, such as a smart phone, or a computer tablet. A display device according to this disclosure may also comprise a composite display in which more than one display device is combined to form an extended display.

Some embodiments have been described. These embodiments are presented by way of example only and are not intended to limit the scope of the disclosure. Indeed, the novel methods, apparatus and systems described herein may be embodied in a variety of other forms. It should be apparent to those skilled in the art that many more modifications besides those already described are possible without departing from the inventive concepts herein. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

The invention claimed is:

1. A method of display on a display device, the method comprising:
   determining a one-dimensional partitioning of an array of data into a plurality of contiguous array portions;
   determining a display size for each array portion based on the size of the array portion, the ratio of the display size determined for the largest array portion divided by the display size determined for the smallest array portion being less than the ratio of the size of the largest array portion divided by the size of the smallest array portion; and
   displaying an image representative of the array of data on the display device, portions of the image corresponding to an array portion being sized according to the display size determined for the array portion.

2. The method of claim 1, wherein determining the one-dimensional partitioning of the array into a plurality of contiguous array portions comprises determining groups of adjacent rows for which each column of the array portion is constant along the length of the column.

3. The method of claim 1, wherein determining the one-dimensional partitioning the array into a plurality of contiguous array portions comprises determining groups of adjacent columns for which each row of the array portion is constant along the length of the row.

4. The method of claim 1, wherein determining a display size for each array portion based on the size of the array portion comprises determining a display size for the array portion as a non-decreasing function of the size of the array portion.

5. The method of claim 1, wherein the image has a display size, the method further comprises determining whether the image based on array portions sized according to the display sizes determined for the array portions will fit in the display size of the image and, if the image based on array portions sized according to the display sizes determined for the array portions will not fit in the display size of the image, determining modified display sizes for the array portions.

6. The method of claim 1, wherein determining display size for each array portion comprises raising the size of an array portion to a power.

7. The method of claim 6, comprising iteratively:
   determining a display size for each array portion based on the power and the size of the array portion;
   determining whether the image based on array portions, the array portions sized according to the display sizes determined according to the power for the array portions, will fit in the display size of the image; and
   modifying the power if the image based on array portions, the array portions sized according to the display sizes determined according to the power for the array portions, will not fit in the display size of the image.

8. The method of claim 7, wherein the power is limited to a predetermined range, the range being preferably 0.3 to 1.0.

9. The method of claim 6, wherein, on determining that the image based on array portions sized according to display sizes determined by raising array sizes to a power will not fit in the display size of the image, the method further comprises:
   combining at least one group of adjacent array portions into a combined array portion; and
   determining a display size for the at least one combined array portion.

10. The method of claim 9, wherein determining a display size for the at least one combined array portion comprises summing the display sizes determined for each of the array portions combined into the combined array portion.

11. The method of claim 9,
   wherein portions of the image corresponding to an array portion other than the array portions that are combined into the at least one combined array portion are sized according to the display size determined for the array portion,
   wherein portions of the image corresponding to the array portions that are combined into the at least one combined array portion are sized according to a display size determined for the combined array portion.

12. The method of claim 11, wherein the at least one combined array portion is displayed differently from other array portions in the image displayed on the display device.

13. The method of claim 1, wherein the determining of a display size for each array portion based on the size of the array portion, the ratio of the display size determined for the largest array portion divided by the display size determined for the smallest array portion being less than the ratio of the size of the largest array portion divided by the size of the smallest array portion, is carried out in response to determining that the array will not fit in the display size of the image if the displayed size of each array element is a minimum display size.

14. The method of claim 1,
   wherein the array of data is based on spreadsheet data; and
   wherein determining a one-dimensional portioning of the array into a plurality of contiguous array portions comprises determining a portioning of the array into contiguous row ranges.

15. The method of claim 14, wherein the array of data is based on an indication of at least one of:
   areas within a spreadsheet in which a change is detected;
   areas within a spreadsheet in which cells have formulas;

areas within a spreadsheet in which cells are populated; and areas within a spreadsheet in which cells match specific conditions.

16. The method of claim 14, wherein the array of data is based on an indication of areas within a spreadsheet in which a change is detected and indicates, for changed cells in the spreadsheet, a type of change.

17. The method of claim 16, wherein the array of data indicates, for changed cells in the spreadsheet, a type of change, the type of change being selected from a group comprising an addition, a deletion, and a modification.

18. The method of claim 14, wherein the displayed image includes an indication of one or more currently selected cells.

19. The method of claim 14, comprising, on detecting, a user interface interaction on the displayed image, determining a location of the user interface action on the displayed image.

20. The method of claim 19, further comprising selecting one or more cells in a spreadsheet based on the determined location, wherein the detected user interaction event corresponds to one of: a mouse click, a touch-screen interaction and a key press.

21. The method of claim 19, further comprising providing on the display an indication of a spreadsheet location corresponding to the determined location, wherein the detected user event corresponds to at least one of: a mouse click, a touch screen click, a key press, and a hover event.

22. A computer system comprising:
a display device; and
at least one processor configured to:
determine a one-dimensional partitioning of an array of data into a plurality of contiguous array portions;
determine a display size for each array portion based on the size of the array portion, the ratio of the display size determined for the largest array portion divided by the display size determined for the smallest array portion being less than the ratio of the size of the largest array portion divided by the size of the smallest array portion; and
display an image representative of the array of data on the display device, portions of the image corresponding to an array portion being sized according to the display size determined for the array portion.

23. The computer system of claim 22, wherein determining the one-dimensional partitioning, of the array into a plurality of contiguous array portions comprises determining groups of adjacent row's for which each column of the array portion is constant along the length of the column.

24. The computer system of claim 22, wherein determining the one-dimensional partitioning of the array into a plurality, of contiguous array portions comprises determining groups of adjacent columns for which each row of the array portion is constant along the length of the row.

25. The computer system of claim 22, wherein determining a display size for each array portion based on the size of the array portion comprises determining, a display size for the array portion as a non-decreasing function of the size of the array portion.

26. The computer system of claim 22, wherein the image has a display size, the at least one processor is further configured to determine whether the image based on array portions sized according to the display sizes determined for the array portions will fit in the display size of the image and, if the image based on array portions sized according to the display sizes determined for the array portions will not fit in the display size of the image, determine modified display sizes for the array portions.

27. The computer system of claim 22, wherein determining a display size for each array portion comprises raising the size of an array portion to a power.

28. The computer system of claim 27, wherein the at least one processor is configured to iteratively:
determine a display size for each array portion based on the power and the size of the array portion,
determine whether the image based on array portions, the array portions sized according to the display sizes determined according to the power for the array portions, will fit in the display size of the image, and
modify the power if the image based on array portions, the array portions sized according to the display sizes determined according to the power for the array portions, will not fit in the display size of the image.

29. The computer system of claim 28, wherein the power is limited to a predetermined range, the range being preferably 0.3 to 1.0.

30. The computer system of claim 27 wherein, on determining, that the image based on array portions sized according to display sizes determined by raising array sizes to a power will not fit in the display size of the image, the at least one processor is configured to:
combine at least one group of adjacent array portions into a combined array portion; and
determine a display size for the at least one combined array portion.

31. The computer system of claim 30, wherein determining a display size for the at least one combined array portion comprises summing the display sizes determined for each of the array portions combined into the combined array portion.

32. The computer system of claim 30,
wherein portions of the image corresponding to an array portion other than the array portions that are combined into the at least one combined array portion are sized according to the display size determined for the array portion,
wherein portions of the image corresponding to the array portions that are combined into the at least one combined array portion are sized according to a display size determined for the combined array portion.

33. The computer system of claim 32, wherein the at least one combined array portion is displayed differently from other array portions in the image displayed on the display device.

34. The computer system of claim 22, wherein the determining of a display size for each array portion based on the size of the array portion, the ratio of the display size determined for the largest array portion divided by the display size determined for the smallest array portion being less than the ratio of the size of the largest array portion divided by the size of the smallest array portion, is carried out in response to determining that the array will not fit in the display size of the image if the displayed size of each array element is a minimum display size.

35. The computer system of claim 22,
wherein the array of data is based on spreadsheet data; and
wherein determining a one-dimensional portioning of the array into a plurality of contiguous array portions comprises determining a portioning of the array into contiguous row ranges.

36. The computer system of claim 35, wherein the array of data is based on an indication of at least one of:

areas within a spreadsheet in which a change is detected;
areas within a spreadsheet in which cells have formulas;
areas within a spreadsheet in Which cells are populated; and
areas within a spreadsheet in which cells match specific conditions.

37. The computer system of claim 35, wherein the array of data is based on an indication of areas within a spreadsheet in which a change is detected and indicates, for changed cells in the spreadsheet, a type of change.

38. The computer system of claim 37, wherein the array of data indicates, for changed cells in the spreadsheet, a type of change, the type of change being selected from a group comprising an addition, a deletion, and a modification.

39. The computer system of claim 33, wherein the displayed image includes an indication of one or more currently selected cells.

40. The computer system of claim 33, comprising, on detecting a user interface interaction on the displayed image, determining a location of the user interface action on the displayed image.

41. The computer system of claim 40, wherein the at least one processor is configured to select one or more cells in a spreadsheet based on the determined location, wherein the detected user interaction event corresponds to one of a mouse click, a touch-screen interaction and a key press.

42. The computer system of claim 40, wherein the at least one processor is configured to provide on the display an indication of a spreadsheet location corresponding to the determined location, wherein the detected user event corresponds to at least one of a mouse click, a touch screen click, a key press, and a hover event.

43. A non-transitory computer-readable medium storing instructions that, when executed by at least one processor, cause the at least one processor to:
   determine a one-dimensional partitioning of an array of data into a plurality of contiguous array portions;
   determine a display size for each array portion based on the size of the array portion, the ratio of the display size determined for the largest array portion divided by the display size determined for the smallest array portion being less than the ratio of the size of the largest array portion divided by the size of the smallest array portion; and
   display an image representative of the array of data on a display device, portions of the image corresponding to an array portion being sized according to the display size determined for the array portion.

44. The non-transitory computer-readable medium of claim 43, wherein determining the one-dimensional partitioning of the array into a plurality of contiguous array portions comprises determining groups of adjacent rows for which each column of the array portion is constant along the length of the column.

45. The non-transitory computer-readable medium of claim 43, wherein determining the one-dimensional partitioning of the array into a plurality of contiguous array portions comprises determining groups of adjacent columns for which each row of the array portion is constant along the length of the row.

46. The non transitory computer-readable medium of claim 43, wherein determining a display size for each array portion based on the size of the array portion composes determining a display size for the array portion as a nondecreasing function of the size of the array portion.

47. The non-transitory computer-readable medium of claim 43, wherein the image has a display size, and the instructions cause the at least one processor to determine whether the image based on array portions sized according to the display sizes determined for the array portions will fit in the display size of the image and, if the image based on array portions sized according to the display sizes determined for the array portions will not fit in the display size of the image, determine modified display sizes for the array portions.

48. The non-transitory computer-readable medium of claim 43, wherein determining a display size for each array portion comprises raising the size of an array portion to a power.

49. The non-transitory computer-readable medium of claim 48, wherein the instructions cause the at least one processor to iteratively:
   determine a display size for each array portion based on the power and the size of the array portion, determine whether the image based on array portions, the array portions sized according to the display sizes determined according to the power for the array portions, will fit in the display size of the image, and
   modify the power if the image based on array portions, the array portions sized according to the display sizes determined according to the power for the array portions, will not fit in the display size of the image.

50. The non-transitory computer-readable medium of claim 49, wherein the power is limited to a predetermined range, the range being preferably 0.3 to 1.0.

51. The non-transitory computer-readable medium of claim 48 wherein, on determining that the image based on array portions sized according to display sizes determined by raising array sizes to a power will not fit in the display size of the image, the instructions cause the at least one processor to:
   combine at least one group of adjacent array portions into a combined array portion; and
   determine a display size for the at least one combined array portion.

52. The non-transitory computer-readable medium of claim 51, wherein determining a display size for the at least one combined array portion composes summing the display sizes determined for each of the array portions combined into the combined array portion.

53. The non transitory computer-readable medium of claim 51,
   wherein portions of the image corresponding to an array portion other than the array portions that are combined into the at least one combined array portion are sized according to the display size determined for the array portion,
   wherein portions of the image corresponding to the array portions that are combined into the at least one combined array portion are sized according to a display size determined for the combined array portion.

54. The non-transitory computer-readable medium of claim 53, wherein the at least one combined array portion is displayed differently from other array portions in the image displayed on the display device.

55. The non-transitory computer-readable medium of claim 43, wherein the determining of a display size for each array portion based on the size of the array portion, the ratio of the display size determined for the largest array portion divided by the display size determined for the smallest array portion being less than the ratio of the size of the largest array portion divided by the size of the smallest array portion, is carried out in response to determining that the array will not fit in the display size of the image if the displayed size of each array element is a minimum display size.

56. The non transitory computer-readable medium of claim 43,
wherein the array of data is based on spreadsheet data; and
wherein determining a one-dimensional portioning of the array into a plurality of contiguous array portions comprises determining a portioning of the array into contiguous row ranges.

57. The non-transitory computer-readable medium of claim 56, wherein the array of data is based on an indication of at least one of:
areas within a spreadsheet in which a Change is detected;
areas within a spreadsheet in which cells have formulas;
areas within a spreadsheet in which cells are populated; and
areas within a spreadsheet in which cells match specific conditions.

58. The non-transitory computer-readable medium of claim 56, wherein the array of data is based on an indication of areas within a spreadsheet in which a change is detected and indicates, for changed cells in the spreadsheet, a type of change.

59. The non-transitory computer-readable medium of claim 57, wherein the array of data indicates, for changed cells in the spreadsheet, a type of change, the type of change being selected from a group comprising an addition, a deletion, and a modification.

60. The non-transitory computer-readable medium of claim 56, wherein the displayed image includes an indication of one or more currently selected cells.

61. The non-transitory computer-readable medium of claim 56, comprising, on detecting a user interface interaction on the displayed image, determining a location of the user interface action on the displayed image.

62. The non-transitory computer-readable medium of claim 61, wherein the instructions cause the at least one processor to select one or more cells in a spreadsheet based on the determined location, wherein the detected user interaction event corresponds to one of: a mouse click, a touchscreen interaction and a key press.

63. The non-transitory computer-readable medium of claim 61, wherein the instructions cause the at least one processor to provide on the display an indication of a spreadsheet location corresponding to the determined location, wherein the detected user event corresponds to at least one of: a mouse click, a touch screen click, a key press, and a hover event.

* * * * *